Sept. 25, 1923.

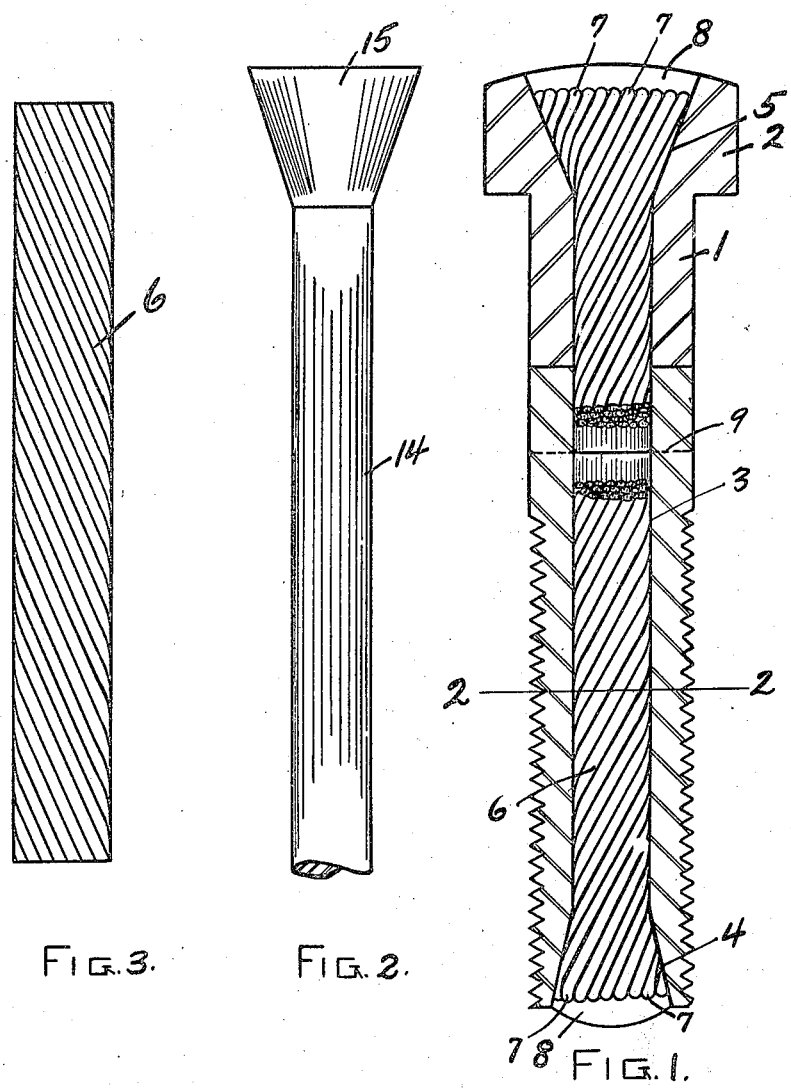

D. J. THOMAS 1,469,126

TELESCOPIC, NONBREAKABLE, AND FLEXIBLE WEDGE BOLT

Filed Aug. 31, 1922   2 Sheets-Sheet 2

D. J. Thomas
Inventor

Patented Sept. 25, 1923.

1,469,126

UNITED STATES PATENT OFFICE.

DANIEL J. THOMAS, OF YOUNGSTOWN, OHIO.

TELESCOPIC, NONBREAKABLE, AND FLEXIBLE WEDGE BOLT.

Application filed August 31, 1922. Serial No. 585,507.

*To all whom it may concern:*

Be it known that DANIEL J. THOMAS, a citizen of the United States of America, residing at Youngstown, in the county of Mahoning and State of Ohio, has invented certain new and useful Improvements in a Telescopic, Nonbreakable, and Flexible Wedge Bolt, of which the following is a specification.

This invention relates to wedge bolts for crank pins and cross head boxings used on steam and gas engines. It is not desired to limit the use of this device to wedge bolts for crank pins and cross head boxings but may be utilized wherever the stress and strain is anyway similar to that above described.

The principal object of my invention is to provide a wedge bolt in two parts, the two ends of the two parts being held securely together by means of a solid bar or cable secured within an interior circular channel on said wedge bolt.

Another object of my invention is to provide a flared opening of each end of said interior circular channel.

Another object of my invention is to enlarge the ends of the cable so as to fill in the flared openings and to secure the same by filling in about the ends of said cable with Babbitt metal or any other suitable material.

A still further object is to provide means for holding the two ends of the wedge bolt in fixed relation to each other.

Engineers have long been troubled with breaking of wedge bolts. When the boxing fits the pin or journal snugly there is very little jar or deflecting of the wedge bolts. Yet there is a slight tendency for the wedge to move because no boxing will run very long when fitted up so closely that the oil has no place to lubricate the boxing. In the use of an ordinary wedge bolt the jar and strain increases as the boxing becomes loosened by wear. When this wearing of the boxing has been taken up by the wedge, the wedge bolts are again subjected to a varying stress and strain as the boxing wears so as to fit less snugly upon its bearing.

When a wedge bolt breaks on a cross head or wrist pin boxing the engine is subjected to a terrific strain and jar due to the sudden loosening of the wedge causing much damage to the engine.

The drawing illustrates a preferred embodiment of the invention. However, it is to be understood that in adapting the same to meeting different conditions, various changes in the form, and minor details of construction may be resorted to without departing from the nature of the invention as claimed and set forth in the drawings:

Figure 1 is a sectional view of the device showing a portion of the cable broken away.

Figure 2 shows a side elevation of a solid binding bar that may be substituted for the cable shown in Figure 1.

Figure 3 is a side elevation of the cable before the ends are prepared for securing close engagement of the wedge bolts.

Corresponding and like parts are referred to in the following description and indicated in the several views of the drawings by like reference characters.

Figure 6:
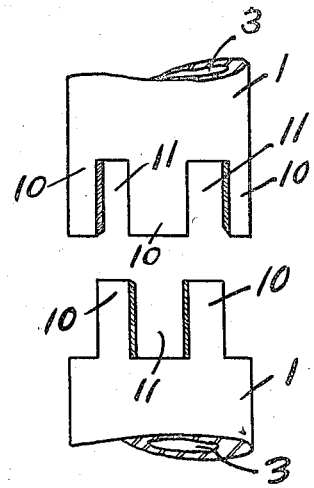
Figure 6 is a detailed view of the wedge bolt showing end engagement.

By referring to Figure 1 it will be seen that the device embodies an ordinary wedge bolt 1 provided with a head 2. This bolt 1 is provided with an interior circular channel 3 having flared openings 4 and 5. These flared openings 4 and 5 are located at the ends of the wedge bolt 1. This interior circular channel 3 as shown in Figure 1 is provided with a cable 6 and is secured within the wedge bolt 1 by turning in the ends 7 of the cable 6 and then pouring into the turned in cable ends 7 Babbitt metal 8 so as to make an enlarged end filling the flared openings 4 and 5. The wedge bolt 1 is joined together at point 9, that is the upper and lower portion of the wedge bolt 1 is held in contact by means of the cable 6. (See Figure 1.) By referring to Figure 6 it will be seen that two sections of the wedge bolt 1 are in fixed relation to each other by means of a plurality of projections 10, spaced apart and arranged so that the projections 10 telescope into the spaced openings 11.

Figure 4:
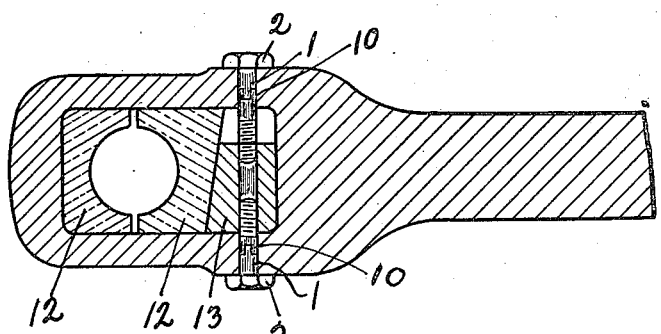
Figure 4 is a sectional view in side elevation of an ordinary crank arm with boxing, wedge and wedge bolts installed.
Figure 5:
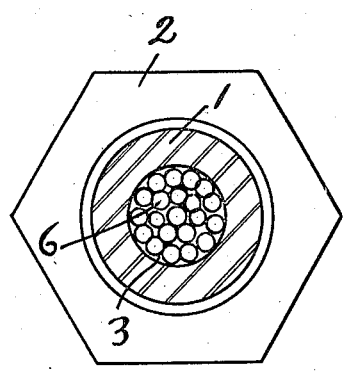
Figure 5 is a cross section of Figure 1 taken on line 2—2.

By referring to Figure 4 it will be seen that I have shown a boxing 12 provided with a wedge 13 and means for operating this wedge 13 by utilizing improved wedge bolt 1.

By referring to Figure 2 it will be seen that I have provided a binding bar 14 which may be substituted for cable 6 if so desired. This binding bar 14 is preferably made of wrought iron in order to withstand the jar and strain. This binding bar 14 is provided at one end with a flared head 15 to fit into the flared opening 5. This binding bar 14 when installed requires an upsetting of one end by means of any ordinary riveting process.

By having the wedge bolt made in two parts with a flexible cable secured to the two parts the bolt will not break. The strain that comes to an ordinary wedge bolt is due to the unflexibleness of the bolt and the strain exerted upon the bolt by a gradual loosening of the wedge. My invention overcomes this possibility of straining and of breaking the wedge bolt.

What I claim is:

A device of the class described comprising a wedge bolt formed of two parts a central circular channel in said wedge bolt, flared openings at each end of said central circular channel, a cable positioned within said central circular channel, the ends of said cable turned in in order to form enlarged ends, molten metal poured in upon the enlarged ends of said cable in order to make a solid unyielding formation, means for holding the inner ends of the parts of said wedge bolt in fixed relation to each other, substantially described for the purpose set forth.

In testimony whereof I affix my signature.

DANIEL J. THOMAS.

Witnesses:
C. A. HARPMAN,
L. A. OMLOR.